(12) United States Patent
Thomas et al.

(10) Patent No.: US 7,864,657 B2
(45) Date of Patent: Jan. 4, 2011

(54) METHOD AND APPARATUS FOR PERFORMING STREAM WEIGHTING IN AN SDMA COMMUNICATION SYSTEM

(75) Inventors: Timothy A. Thomas, Palatine, IL (US); Frederick W. Vook, Schaumburg, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 631 days.

(21) Appl. No.: 11/419,856

(22) Filed: May 23, 2006

(65) Prior Publication Data

US 2007/0274197 A1     Nov. 29, 2007

(51) Int. Cl.
*H04J 3/10* (2006.01)
(52) U.S. Cl. ....................................... 370/201
(58) Field of Classification Search ................ 370/329, 370/208, 201; 375/340, 267, 296; 455/562
See application file for complete search history.

(56) References Cited

U.S. PATENT DOCUMENTS

| | | | |
|---|---|---|---|
| 5,634,199 A | 5/1997 | Gerlach et al. | |
| 6,134,277 A | 10/2000 | Shah | |
| 6,188,915 B1 * | 2/2001 | Martin et al. | 455/562.1 |
| 6,363,341 B1 | 3/2002 | Tolhuizen et al. | |
| 6,463,295 B1 | 10/2002 | Yun | |
| 6,563,812 B1 | 5/2003 | De | |
| 6,754,624 B2 | 6/2004 | Choy et al. | |
| 6,829,312 B1 * | 12/2004 | Laurila et al. | 375/340 |
| 6,865,377 B1 | 3/2005 | Lindskog et al. | |
| 6,982,968 B1 | 1/2006 | Barratt et al. | |
| 7,317,764 B2 * | 1/2008 | Hochwald et al. | 375/296 |
| 7,426,198 B2 | 9/2008 | Mondal et al. | |
| 2003/0100343 A1 | 5/2003 | Zourntos et al. | |
| 2005/0143014 A1 | 6/2005 | Li et al. | |
| 2005/0249304 A1 * | 11/2005 | Takano et al. | 375/267 |

(Continued)

FOREIGN PATENT DOCUMENTS

EP      1598955 A    11/2005

(Continued)

OTHER PUBLICATIONS

Chen, Hao-Min et al.: Transmit and receive Weights Optimization Algorithm in MIMO-SDMA System, The 14th IEEE 2003 International Symposium on Personal, Indoor, and Mobile Radio Communication Proceedings, Beijing, China, pp. 2868-2872.

(Continued)

*Primary Examiner*—Derrick W Ferris
*Assistant Examiner*—Gbemileke Onamuti
(74) *Attorney, Agent, or Firm*—Daniel K. Nichols; Kenneth A. Haas; Sylvia Chen

(57) ABSTRACT

A method and apparatus for performing stream weighting in a spatial-division multiple access communication system is provided herein. During operation the base station receiver receives channel information from mobiles (also known as users or nodes) and calculates transmit antenna weights that that maximize the power delivered to each mobile while allowing for a small amount of crosstalk to exist between users. Information or data is transmitted to the nodes utilizing the appropriate stream weights. By allowing tolerable amounts of cross talk, the coherent gain to the desired SDMA user can be increased, and thus the overall performance is improved.

10 Claims, 2 Drawing Sheets

U.S. PATENT DOCUMENTS

| | | |
|---|---|---|
| 2005/0254477 A1 | 11/2005 | Lee et al. |
| 2006/0164972 A1* | 7/2006 | van Rensburg et al. ...... 370/208 |
| 2007/0183362 A1* | 8/2007 | Mondal et al. .............. 370/329 |
| 2008/0305805 A1 | 12/2008 | Mondal et al. |

FOREIGN PATENT DOCUMENTS

| | | |
|---|---|---|
| WO | 2007092671 A2 | 8/2007 |

OTHER PUBLICATIONS

Schubert, M. et al.: Iterative Multiuser Uplink and Downlink Beamforming Under SINR Constraints, IEEE Transactions on Signal Processing, vol. 53, No. 7, Jul. 2005, pp. 2324-2334.

Spencer, Quentin H. et al.: Zero-Forcing Methods for Downlink Spatial Multiplexing in Multiuser MIMO Channels, IEEE Transactions on Signal Processing, vol. 52, No. 2, Feb. 2004, pp. 461-471.

Patent Cooperation Treaty; "Notification of Transmittal of the International Search Report and the Written Opinion of the International Searching Authority, or the Declaration" for International Application No. PCT/ US2007/065835; Aug. 28, 2007; 14 pages.

Toshihiko Nishimura, et al.; "Downlink Beamforming for an SDMA Terminal with Joint Detection"; IEEE Proceedings Vehicular Technology Conference (VTC-2001/Fall); Oct. 2001; pp. 1538-1542; Atlantic City, New Jersey, USA.

Minjoong Rim; "Multi-User Downlink Beamforming with Multiple Transmit and Receive Antennas"; Electronic Letters; Dec. 5, 2002; pp. 1725-1726; vol. 38, No. 25.

Andre Bourdoux and Nadia Khaled; "Joint Tx-Rx optimisation for MIMO-SDMA Based on a Null-Space Constraint"; IEEE Proceedings Vehicular Technology Conference (VTC-2002/Fall); Sep. 2002; pp. 171-174; Vancouver, Canada.

Timothy A. Thomas and Frederick W. Vook; "MIMO Strategies for Equal-Rate Data Streams"; IEEE Proceedings Vehicular Technology Conference (VTC-2001/Fall); Oct. 2001; pp. 1/5; Schaumburg, Illinois, USA.

Patent Cooperation Treaty, PCT Search Report and Written Opinion of the International Searching Authority for International Application No. PCT/US07/60894, Oct. 29, 2007, 8 pages.

Korean Intellectual Property Office, Notice of Preliminary Rejection for Korean Patent Application No. 10-2008-7021742, Jun. 25, 2010, 4 pages.

United States Patent and Trademark Office, Notice of Allowance and Fee(s) Due for U.S. Appl. No. 11/275,938, Aug. 5, 2008, 11 pages.

* cited by examiner

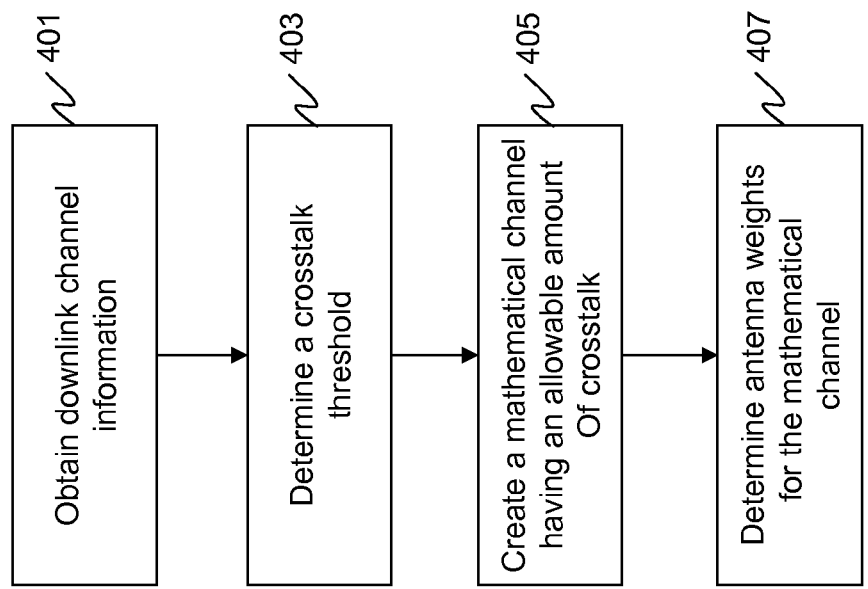
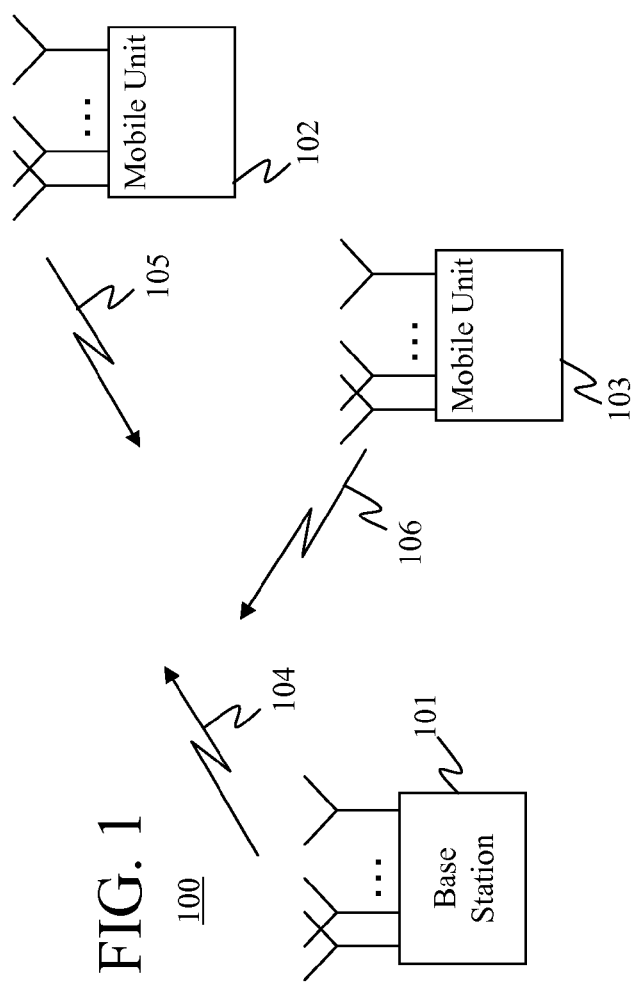

101

METHOD AND APPARATUS FOR PERFORMING STREAM WEIGHTING IN AN SDMA COMMUNICATION SYSTEM

FIELD OF THE INVENTION

The present invention relates generally to data stream weighting, and in particular, to a method and apparatus for performing stream weighting in a spatial-division multiple access communication system.

BACKGROUND OF THE INVENTION

Transmit beamforming (sometimes referred to as transmit adaptive array (TXAA) transmission) increases the effective signal-to-noise seen by a receiver device by creating a coverage pattern that tends to be directional in nature (i.e., not uniformly broadcast). This is accomplished by employing multiple antennas at the transmit site and weighting each antenna such that the combined transmissions result in a beamformed pattern that delivers maximum power/energy to the receiver. In the case of simultaneously transmitting multiple streams to multiple receivers (i.e., transmit spatial division multiple access or SDMA), the antenna weights are chosen so that a minimum amount of crosstalk or interference between users is achieved.

However, forcing all crosstalk to a minimum is restrictive. By allowing tolerable amounts of cross talk, the coherent gain to the desired SDMA user can be increased, and thus the overall performance improved. Thus, choosing antenna weights that minimizes crosstalk between users may result in the best theoretical performance of the communication system at very high SNRs; however, having some crosstalk will be acceptable because this will be buried in the channel noise. Thus, forcing the antenna weights to deliver a minimum amount of crosstalk is unnecessary since a low amount of crosstalk will be buried in the channel noise and therefore will not degrade performance. Therefore, a need exists for a method and apparatus for performing stream weighting in a spatial-division multiple access communication system that allows for some crosstalk between users.

BRIEF DESCRIPTION OF THE DRAWINGS

FIG. 1 is a block diagram of a communication system employing spatial-division multiple access.

FIG. 4 is a flow chart showing the operation of the base station of FIG. 2.

DETAILED DESCRIPTION OF THE DRAWINGS

Figure 3:
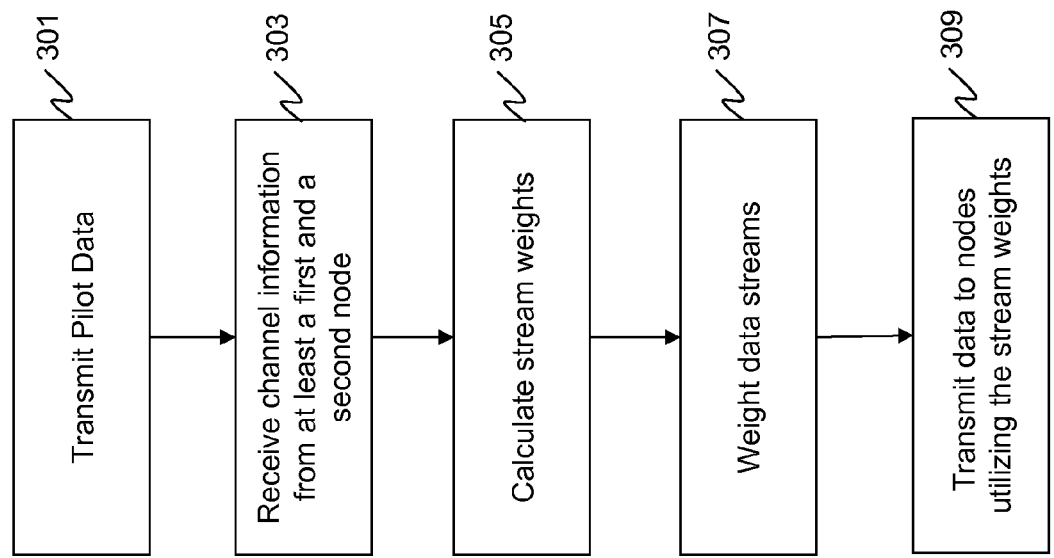
FIG. 3 is a flow chart showing the operation of the base station of FIG. 2.

In order to address the above-mentioned need, a method and apparatus for performing stream weighting in a spatial-division multiple access communication system is provided herein. During operation the base station receiver receives channel information from mobiles (also known as mobile units, users, subscriber stations, or nodes) and calculates antenna weights that that maximize the power to each mobile while allowing for a small amount of crosstalk to exist between users. Information or data is transmitted to the nodes utilizing the appropriate stream weights. By allowing tolerable amounts of cross talk, the coherent gain to the desired SDMA user can be increased, and thus the overall performance is improved.

The present invention comprises a method for performing stream weighting in a spatial division multiple access (SDMA) communication system The method comprises the steps of receiving a plurality of data streams for each of a plurality of nodes, calculating stream weights for each of the plurality of data streams, and weighting the plurality of data streams with the stream weights. The stream weights maximize power to nodes while allowing some crosstalk to exist at other nodes. The weighted data streams are then transmitted to the nodes.

The present invention additionally encompasses a method comprising the steps of determining downlink channel information from a plurality of mobiles, determining a crosstalk threshold, and creating a mathematical channel having an allowable amount of crosstalk. Antenna weights are computed for the mathematical channel. The antenna weights are based on the crosstalk threshold and the mathematical channel.

The present invention additionally encompasses an apparatus comprising stream weighting circuitry receiving a plurality of data streams for each of a plurality of nodes, and calculating stream weights for each of the plurality of data streams. The stream weights maximize power to nodes while allowing some crosstalk to exist at other nodes. The weighting circuitry weights the plurality of data streams with the stream weights. Transmit circuitry is provided for transmitting the weighted streams to the nodes.

Turning now to the drawings, wherein like numerals designate like components, FIG. 1 is a block diagram of communication system 100. In the preferred embodiment of the present invention, communication system 100 utilizes an Orthogonal Frequency Division Multiplexing (OFDM) or multicarrier based architecture. In alternate embodiments of the present invention, this architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques.

As shown, communication system 100 comprises base station 101 and multiple mobile or stationary nodes 102-103. Although only a single base station and two nodes are shown, one of ordinary skill in the art will recognize that such communication systems generally comprise multiple base stations 101 in communication with many nodes 102-103. During operation, communication system 100 utilizes SDMA to beamform transmissions between base station 101 and nodes 102-103. As discussed above, beamforming is accomplished by employing multiple antennas at the transmit site and weighting each antenna such that the combined transmissions result in a beamformed pattern having a maximum power received at the receivers. As discussed, forcing all crosstalk to a minimum may be too restrictive. By allowing tolerable amounts of cross talk, the coherent gain to each SDMA user can be increased, and thus the overall performance improved. Thus, choosing antenna weights that minimizes crosstalk between users may result in the best theoretical performance of the communication system when there is no channel noise; however, having some crosstalk will be acceptable when the crosstalk is buried in the channel noise. Thus, forcing the antenna weights to minimize the amount of crosstalk is unnecessary since a low amount of crosstalk will be buried in the channel noise and therefore won't degrade performance.

In order to address this issue, base station 101 will choose antenna weights that will allow some crosstalk between users.

To determine the appropriate antenna weights for a user (u will be used as an integer to indicate the user number), in a time division duplex (TDD) system, nodes 102-103 transmit pilot information from each antenna at the node to the base station 101 on the uplink of a communication system (this process is also known as "uplink sounding"). Base station 101 then computes uplink channel estimates for each antenna at each node. Base station 101 then will compute downlink channel estimates for each base station antenna to each node antenna based on the uplink channel estimates. In a frequency division duplex (FDD) system (this approach is known as "channel feedback"), the base station 101 broadcasts a pilot sequence from each of its antennas that are received by nodes 102-103. Nodes 102-103 perform channel estimation based on the received pilot sequence and determine a channel estimate that results in a maximum received power at the individual mobile when the base uses the channel estimate to compute transmit weights. Once a node determines the appropriate channel estimate, the channel estimates (H) are transmitted to base station 101. Whether in FDD or TDD, the channel estimates are utilized by the base station 101 (with other information) to determine the appropriate antenna weights for the particular node. In particular, a crosstalk threshold ($\gamma$) is determined which enables an allowable amount of crosstalk between users that any calculated antenna weights will produce. A mathematical channel (also known as a virtual or simulated channel) is created by base station 101 having the allowable amount of crosstalk, and the antenna weights are computed for the mathematical channel. A more detailed explanation of determining channel weights follows.

Let there be $M_b$ transmit antennas at base station 101, $M_m$ receive antennas at each mobile 102-103 (the number of receive antennas does not necessarily need to be the same at each mobile, but to simplify the presentation, it will be assumed that each mobile has the same number of receive antennas), $N_u$ mobiles (i.e., the transmit SDMA factor is $N_u$), and $N_s$ data streams to be transmitted to each mobile 102-103 (the number of data streams transmitted to each mobile does not necessarily need to be the same, but again to simplify the presentation, it will be assumed that the same number of data streams are transmitted to each mobile). Assuming an OFDM downlink with K usable subcarriers, the received $M_m \times 1$ signal at mobile u on subcarrier k ($1 \leq k \leq K$) and symbol time b is given as:

$$Y_u(k,b) = H_u(k,b)V_u(k)x_u(k,b) + Z_u(k,b) + N_u(k,b) \quad (1)$$

where $H_u(k,b)$ is mobile u's $M_m \times M_b$ downlink channel matrix on subcarrier k and OFDM symbol b, $V_u(k)$ is mobile u's $M_b \times N_s$ transmit weight vector on subcarrier k (in the preferred embodiment $V_u(k)$ is time invariant, however the extension to time-varying transmit weights is straightforward), $x_u(k,b)$ is mobile u's $N_s \times 1$ vector of symbol values on subcarrier k and OFDM symbol b, $Z_u(k,b)$ is an $M_m \times 1$ vector of cross talk, and $N_u(k,b)$ is an $M_m \times 1$ vector of additive noise with covariance matrix that may be $\sigma_n^2 I_{M_m}$ where $\sigma_n^2$ is the noise power on each receive antenna at the mobile and $I_m$ is an m×m identity matrix. The cross-talk term for mobile u is given as:

$$Z_u(k,b) = H_u(k,b) \sum_{\substack{l=1 \\ l \neq u}}^{N_u} V_l(k) x_l(k,b) \quad (2)$$

All prior art techniques of generating stream weights enforce the zero-forcing criteria, meaning that there is no cross talk to the other transmit SDMA users. However, the zero-forcing criteria may be too restrictive. By allowing tolerable amounts of cross talk, the coherent gain to the desired SDMA user can be increased, and thus the overall performance is improved. Allowing cross talk is also important in mobility since cross talk will be present due to channel variations from when $V_u(k)$ is calculated and when it is used to transmit the data streams. Thus allowing some cross talk in the design does not degrade performance in mobility but enhances it because of the increased coherent gain to the desired SDMA user. Some techniques to affect this cross talk tradeoff are presented in the following sections.

Projection Matrix Approach

The projection method explored here allows some degree of cross talk. The idea is to only take the eigenmodes of the projection matrix to the orthogonal complement of the other SDMA users' channels that are above some threshold. Thus the lower-powered eigenmodes cause some acceptable amounts of cross talk. The steps for computing the transmit weights for mobile u, $V_u(k)$, using this method are as follows:

1. Pick an allowable amount of crosstalk, $\gamma$ and let $N_x = \min(M_b, M_m(N_u-1))$. For example, pick $\gamma = N_u N_s \sigma_n^2 10^{-0.6}$ (i.e., allow expected cross talk up to 6 dB below the noise power).
2. Stack the channels of all mobiles except for mobile u into the following $M_b \times M_m(N_u-1)$ matrix:

$$G_u(k,b) = [H_1^H(k,b) | \ldots | H_{u-1}^H(k,b) | H_{u+1}^H(k,b) | \ldots | H_{N_u-1}^H(k,b)] \quad (3)$$

3. Let $q_1(k,b)$ through $q_{N_x}(k,b)$ be the ordered eigenvalues (from strongest to weakest) and $u_1(k,b)$ through $u_{N_x}(k,b)$ be the associated eigenvectors of $G_u(k,b)G_u^H(k,b)$.
4. Normalize the eigenvalues as follows: $q_l(k,b) = q_l(k,b)/q_1(k,b)$ for $l = 1, \ldots, N_x$.
5. Let $N_q(k,b)$ be the number of normalized eigenvalues greater than $\gamma$.
6. Compute the $M_b \times M_b$ projection matrix $P(k,b)$ as follows:

$$P(k, b) = I_{M_b} - \sum_{l=1}^{N_q(k,b)} \frac{u_l(k, b) u_l^H(k, b)}{u_l^H(k, b) u_l(k, b)} \quad (4)$$

7. Compute the mathematical channel $H_u(k,b)P(k,b)$ having the allowable amount of crosstalk and use this mathematical channel in place of $H_u(k,b)$ to compute $V_u(k)$ (e.g., using the technique described in T. A. Thomas, F. W. Vook, "MIMO Strategies for Equal-Rate Data Streams," IEEE VTC-2001/Fall, October 2001.). The mathematical channel is a multiplication of a channel matrix for a node by an inverse matrix containing channels to the other nodes.

An alternative approach is to determine a weighting to place on each of the channels in (3) so that the cross talk to the other SDMA users is at a given level. This technique would require an iterative procedure since $V_u(k)$ determines the cross talk and thus the calculation of $V_u(k)$ (whose calculation can be highly nonlinear) has to be performed with the weight calculation.

Matrix Inverse Approach

This method operates by creating a mathematical channel which is the multiplication of the channel matrix for mobile u by an inverse matrix containing the channels to the other SDMA mobiles. By using a matrix inverse, cross talk is allowed in a manner similar to how linear MMSE combining works in receive SDMA (i.e., linear MMSE combining trades off interference suppression and noise enhancement whereas the proposed transmit SDMA trades off cross talk with coherent signal gain). The first matrix inverse method that will be described scales the power of the identity matrix in the matrix inverse to give an expected cross talk at a certain level. The second matrix inverse method fixes the power of the identity matrix and scales the power of each SDMA user's channel in the inverse to make the expected cross talk be a certain level.

For the identity matrix scaling, the inverse matrix for mobile u, $R_u(k,b)$ is given as:

$$R_u(k,b) = \left(\alpha I_{M_b} + \sum_{\substack{l=1 \\ l \neq u}}^{N_u} H_l^H(k,b)H_l(k,b)\right)^{-1} \quad (5)$$

where $\alpha$ is chosen to give a specific desired level of cross talk. One option for $\alpha$ is to tie it to the expected Doppler frequency, $f_d$, as follows:

$$\alpha = M_m(N_u N_s - 1)\left(1 - \left(\frac{\sin(2\pi f_d D \Delta)}{2\pi f_d D \Delta}\right)^2\right) \quad (6)$$

where D is the delay in number of OFDM symbols from the time the channel measurement was made and where the weights are applied and $\Delta$ is the time between two adjacent OFDM symbols. The idea for this choice of $\alpha$ is to allow more cross talk in mobility and also improve the coherent gain in mobility. The transmit weight vectors for mobile u are then found using the mathematical channel, $H_u(k,b)R_u(k,b)$, instead of $H_u(k,b)$ using a procedure such as given in T. A. Thomas, F. W. Vook, "MIMO Strategies for Equal-Rate Data Streams," *IEEE VTC*-2001/*Fall*, October 2001.

The second method is an iterative procedure for choosing power weightings, $\alpha_1$ through $\alpha_{N_u}$, on each SDMA user's channel matrix using the following $R_u(k,b)$:

$$R_u(k,b) = \left(I_{M_b} + \sum_{\substack{l=1 \\ l \neq u}}^{N_u} \alpha_l H_l^H(k,b)H_l(k,b)\right)^{-1} \quad (7)$$

Then the transmit weight vectors for mobile u are found using the mathematical channel, $H_u(k,b)R_u(k,b)$, instead of $H_u(k,b)$ using a procedure such as given in T. A. Thomas, F. W. Vook, "MIMO Strategies for Equal-Rate Data Streams," *IEEE VTC*-2001/*Fall*, October 2001. The following iterative procedure can be used to find the power weightings for $R_u(k,b)$ for mobile u:

1. Choose an acceptable level of cross talk, $\gamma$, for each mobile to give to other users, set e=1, choose a maximum number of iterations $I_{max}$, set i=1, and set c=1000 (c is a variable used to store the cross talk value).
2. Start with $\alpha_l=1$ for $l=1, \ldots, N_u$ $l \neq u$ and set $\alpha_{l,old}=\alpha_l$ for $l=1, \ldots, N_u$ $l \neq u$.
3. Compute $R_u(k,b)$ from (7).
4. Compute $V_u(k)$ using the mathematical channel, $H_u(k,b)R_u(k,b)$, in place of $H_u(k,b)$ (e.g., using the technique of T. A. Thomas, F. W. Vook, "MIMO Strategies for Equal-Rate Data Streams," *IEEE VTC*-2001/Fall, October 2001).
5. Compute the average cross talk at each receive antenna of each other mobile, $t_l$, for $l=1, \ldots, N_u$, $l \neq u$ using ($v_{u,l}(k)$ is the $l^{th}$ column of $V_u(k)$):

$$t_l = \frac{1}{M_m} \sum_{n=1}^{N_s} v_{u,p}^H(k) H_l^H(k,b) H_l(k,b) v_{u,p}(k) \quad (8)$$

6. Set $c_{old}=c$.
7.

$$c = \frac{1}{N_u - 1} \sum_{\substack{l=1 \\ l \neq u}}^{N_u} t_l$$

8. If $c > c_{old}$, then set $c=c_{old}$, set $\alpha_l = \alpha_{l,old}$ for $l=1, \ldots, N_u$ $l \neq u$, and set e=e/2.
9. Set $\alpha_{l,old} = \alpha_l$ for $l=1, \ldots, N_u$, $l \neq u$.
10. Set $\alpha_l = \alpha_l(t_l/\gamma)^e$.
11. i=i+1.
12. If $i < I_{max}$, then go to step 3.
13. Use $V_u(k)$ as the transmit weights for mobile u.

Note that if a pre-determined value of $\alpha$ is used for the first matrix inverse method, the computational complexity is much lower than the second method because no iterations are required.

Figure 2:
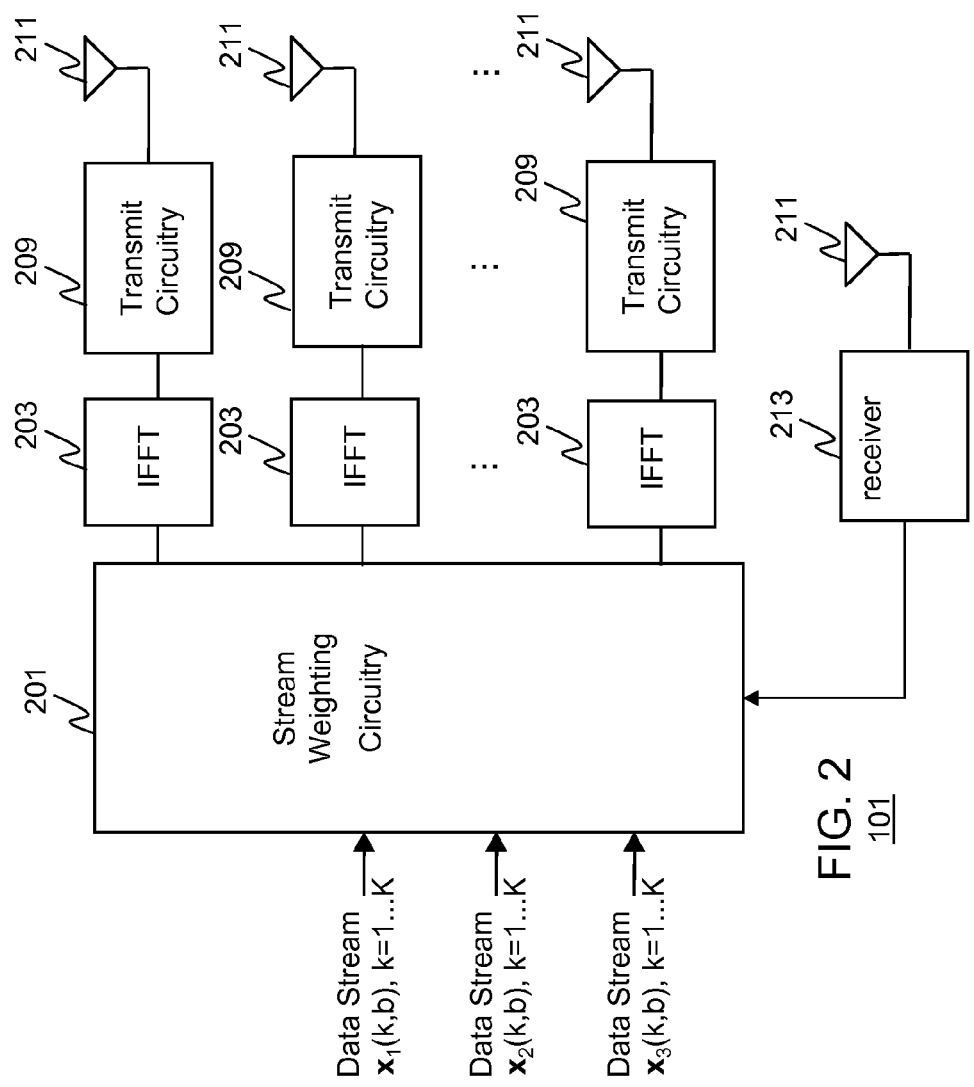
FIG. 2 is a block diagram of a base station of FIG. 1.

FIG. 2 is a block diagram of base station 101. Base station 101 comprises stream weighting circuitry 201, inverse Fast Fourier Transform (IFFT) circuitry 203, and transmit circuitry 209. During operation an $N_s \times 1$ data stream (at symbol time b) for mobile u $x_u(k,b)$, k=1, 2, ... K (where data streams for $N_u$=3 mobiles are shown) enters stream weighting circuitry 201 (where K is the number of subcarriers). Note that the weighting operation performed by the stream weighting circuitry will be performed for each of the $N_s$ data streams to be delivered (transmitted) to each of the $N_u$ nodes (mobiles). Stream weighting circuitry 201 outputs a plurality of weighted data streams, and in particular, one weighted data stream per antenna. Each data stream is appropriately weighted in the frequency domain by an antenna-specific weight, $V_u(k)$ where u=1, 2, ... $N_u$ and the results are summed across SDMA users to create a weighted data stream for each of the transmit antennas (alternatively referred to as "antenna stream"). The weights are chosen as described above to allow for some crosstalk between users. Note that the weights may or may not be different on each beamformed subcarrier. Since $\{V_u(k)\}_m$ (where $\{A\}_m$ is the $m^{th}$ row of the matrix A) is the weight for transmit antenna m, mobile u, and subcarrier k, then stream weighting circuitry 201 outputs weighted data/antenna stream $$s_m(k,b) = \sum_{u=1}^{N_u} \{V(k)\}_m x_u(k,b)$$

for transmit antenna m.

IFFT circuitry 203 performs an inverse Fast Fourier Transform on each weighted data stream, $s_m(k,b)$, converting the frequency-domain data stream into a time-domain data stream. An optional cyclic extension operation can be carried out via cyclic extension circuitry (not shown) on the output of the IFFT circuitry 203 before the resulting output of the IFFT circuitry 203 is sent to the transmit circuitry 209. In particular, a cyclic prefix, or guard interval may be added by the cyclic extension circuitry. The cyclic prefix is typically longer than the expected maximum delay spread of the channel. As one of ordinary skill in the art will recognize, the cyclic extension can comprise a prefix, postfix, or a combination of a prefix and a postfix. The cyclic extension is an inherent part of the OFDM communication system. The inserted cyclic prefix makes the ordinary convolution of the transmitted signal with the multipath channel appear as a cyclic convolution when the impulse response of the channel ranges from 0 to $L_{CP}$, where $L_{CP}$ is the length of the cyclic extension. Finally, the properly weighted data streams are OFDM modulated and the output of the IFFT circuitry (or optionally the output of the cyclic extension circuitry) are transmitted by transmitters 209 from antennas 211.

As is evident, base station 101 additionally comprises receiver 213 for receiving channel information and/or pilot sequences transmitted by nodes. The receiver will compute channel estimates using this channel information or these pilot sequences and the channel estimates will be passed to stream weighting circuitry 201 in order to determine the appropriate antenna/stream weightings to use when communicating to a particular node.

FIG. 3 is a flow chart showing operation of the base station of FIG. 2 when channel feedback is used to obtain downlink channel estimates. The logic flow begins at step 301 where pilot data is transmitted to at least a first and a second node. The transmission of pilot data simply comprises the transmission of a known sequence from each of the multiple antennas 211. The known sequence could be different for each antenna, and/or could be transmitted on different channel resources from each antenna. In response, receiver 213 receives channel information (i.e., channel estimates) from nodes at step 303. As discussed above, the channel information comprises information on which antenna weights will be calculated that maximize the power to the mobile and allows for an amount of crosstalk to exist between users.

At step 305 stream weighting circuitry 201 receives a plurality of data streams and calculates stream weights for each data stream. As discussed above, the first stream weights will maximize power to the first node while allowing some crosstalk to exist at other nodes. At step 307 the streams are weighted and at step 309 weighted information or data streams are transmitted to the nodes.

FIG. 4 is a flow chart showing operation of stream weighting circuitry 201 when calculating stream weights. The logic flow begins at step 401 where downlink channel information (H) is obtained for each mobile (for example with either channel feedback or uplink sounding). At step 403, a crosstalk threshold (γ) is chosen that will produce an allowable amount of crosstalk between users. A mathematical channel is created having the allowable amount of crosstalk (step 405) and antenna weights are computed as a function of the mathematical channel (step 407). As mentioned above, the antenna weights may be computed using the projection matrix approach, or the matrix inverse approach.

While the invention has been particularly shown and described with reference to a particular embodiment. For example, the technique described in this report can be easily extended to the case where each mobile has a different number of data streams and/or receive antennas. It will be understood by those skilled in the art that various changes in form and details may be made therein without departing from the spirit and scope of the invention. It is intended that such changes come within the scope of the following claims.

The invention claimed is:

1. A method for performing stream weighting in a spatial division multiple access (SDMA) communication system, the method comprising the steps of:
   receiving a plurality of data streams for each of a plurality of nodes;
   determining downlink channel information from the plurality of nodes;
   choosing an allowable amount of crosstalk based on the determined downlink channel information;
   creating, by a base station, a mathematical channel having the allowable amount of crosstalk, wherein the mathematical channel is a multiplication of a channel matrix for node u by an inverse matrix containing channels to other nodes;
   computing stream weights based on the mathematical channel for each of the plurality of data streams, wherein the stream weights maximize power to node u while allowing at least the allowable amount of crosstalk to exist at the other nodes;
   weighting the plurality of data streams with the stream weights; and
   transmitting the weighted data streams to the plurality of nodes.

2. The method of claim 1 wherein the step of creating, by the base station, the mathematical channel comprises the step of computing a mathematical channel which is a multiplication of a channel matrix for the node u by a projection matrix designed to give a desired level of crosstalk.

3. The method of claim 1
   wherein the step of creating, by the base station, the mathematical channel is based on the downlink channel information from the plurality of nodes.

4. A method in a communication device comprising the steps of:
   determining downlink channel information from a plurality of nodes;
   determining a crosstalk threshold based on the downlink channel information;
   creating, by a base station, a mathematical channel having an allowable amount of crosstalk, wherein the mathematical channel is a multiplication of a channel matrix for node u by an inverse matrix containing channels to other nodes; and
   computing antenna weights for the mathematical channel, wherein the antenna weights are based on the crosstalk threshold and the mathematical channel.

5. The method of claim 4 further comprising the step of:
   transmitting data to the plurality of nodes, wherein the data is weighted with the antenna weights.

6. The method of claim 4 wherein the crosstalk threshold enables an allowable amount of crosstalk.

7. The method of claim 4 wherein the antenna weights are designed for a plurality of data streams to each of the plurality of nodes.

8. An apparatus comprising:
   stream weighting circuitry for
      receiving a plurality of data streams for each of a plurality of nodes,
      determining downlink channel information from the plurality of nodes, wherein the down link, channel in information is utilized to choose an allowable amount of crosstalk;
      creating, by a base station, a mathematical channel having the allowable amount of crosstalk, wherein the mathematical channel is a multiplication of a channel matrix for node u by an inverse matrix containing channels to other nodes, computing stream weights based on the mathematical channel for each of the plurality of data streams, wherein the stream weights maximize power to node u while allowing at least the allowable amount of crosstalk to exist at the other nodes, and weighting the plurality of data streams with the stream weights; and transmit circuitry for transmitting the weighted streams to the plurality of nodes.

9. The apparatus of claim 8 wherein the mathematical channel is a multiplication of a channel matrix for the node u by a projection matrix designed to give a desired level of crosstalk.

10. The apparatus of claim 8 further comprising:

a receiver receiving the downlink channel information from the plurality of nodes; and wherein the stream weights are based on the downlink channel information from the plurality of nodes.

* * * * *